United States Patent [19]

Lambeth et al.

[11] 4,423,934

[45] Jan. 3, 1984

[54] PHOTOGRAPHIC CAMERA WITH DIGITAL CONTROLLER AND METHOD OF MANUFACTURE

[75] Inventors: David N. Lambeth, Webster; James K. Lee, Pittsford; Lee F. Frank, Rochester, all of N.Y.

[73] Assignee: Eastman Kodak Company, Rochester, N.Y.

[21] Appl. No.: 364,832

[22] Filed: Apr. 2, 1982

[51] Int. Cl.³ .................. G03B 3/10; G03B 7/097
[52] U.S. Cl. ............................ 354/412; 354/402
[58] Field of Search ............. 354/23 D, 25, 43, 50

[56] References Cited

U.S. PATENT DOCUMENTS

| | | | |
|---|---|---|---|
| 3,646,331 | 2/1972 | Lord | 235/151.3 |
| 3,738,242 | 6/1973 | Lee et al. | 355/68 X |
| 3,906,207 | 9/1975 | Rivere et al. | 235/150.2 |
| 3,942,184 | 3/1976 | Blinow et al. | 354/42 |
| 4,053,907 | 10/1977 | Iwata et al. | 354/29 |
| 4,079,386 | 3/1978 | Murakami et al. | 354/23 D |
| 4,079,387 | 3/1978 | Kawamura et al. | 354/23 D |
| 4,084,240 | 4/1978 | Lappington | 364/425 |
| 4,128,900 | 12/1978 | Lappington | 365/94 |
| 4,310,237 | 1/1982 | Gengelbach | 355/14 E |
| 4,333,722 | 6/1982 | Lee et al. | 354/234 |

*Primary Examiner*—Michael L. Gellner
*Attorney, Agent, or Firm*—Thomas H. Close

[57] ABSTRACT

A digital controller in a photographic camera comprises a microcomputer and one or more digital computer controlled input and output transducers such as scene light measuring means, subject distance measuring means, and means for controlling aperture size, shutter time, or focus adjustment. The microcomputer receives inputs from the input transducers and controls the output transducers in response thereto according to a control program stored in a computer memory. The controller includes a programable memory containing custom control constants to custom tailor the operating program for the specific apparatus in which it resides.

According to a preferred embodiment of the invention, a high precision photographic camera is produced by first making the photographic camera, then operating the camera under known operating conditions using a nominal control program. The responces of the output transducers under the known operating conditions are measured and custom tailored control constants are generated for the camera. The custom tailored control constants are then programed into the programable memory to bring the operation of the camera into conformity with desired parameters to complete the manufacture of the camera.

9 Claims, 15 Drawing Figures

WAVEFORM GENERATOR SUBROUTINE

PHOTOGRAPHIC CAMERA WITH DIGITAL CONTROLLER AND METHOD OF MANUFACTURE

BACKGROUND OF THE INVENTION

1. Field of the Invention

This invention relates to photographic cameras and methods of manufacture thereof, and more particularly to a method of economically manufacturing a high-precision computer controlled photographic camera.

2. Discussion Related to the Problem

The trend in photographic camera control is toward the use of a small digital computer called a microcomputer to control all camera functions. The microcomputer accepts digital inputs from a variety of transducers in the camera, such as scene-light measuring apparatus, camera mechanism position indicators, automatic range finders, and a switch or button that is actuated by the photographer to initiate an exposure. The microcomputer responds to these inputs to produce control signals for various functions in the camera, such as lens focus, aperture size, shutter operation, mirror movement, and film advance. The control signals, as produced by the microcomputer, are in a digital format; thus necessitating the step of digital-to-analog conversion when an analog output or input transducer is employed. Whenever possible, it is desirable to eliminate the step of digital-to-analog conversion by employing a transducer that can be driven directly by a digital signal, thereby simplifying the camera mechanism and reducing the overall cost.

A planar electromechanical actuator, particularly adapted to be controlled directly by a digital computer, is disclosed in U.S. patent application Ser. No. 219,168 "Method of Controlling Electromagnetic Actuator in a Camera and Actuator Controllable Thereby," filed Dec. 22, 1980 in the name of J. K. Lee and assigned to the present Assignee now U.S. Pat. No. 4,333,722. In one embodiment, the actuator is employed to control a shutter/aperture in a camera, and comprises an armature having a substantially flat conductor coil. The armature is mounted for pivotal movement relative to the camera with the coil disposed in a magnetic field. A flexible conductor applies current to the armature, whereby an electromagnetic force is generated on the coil to cause the armature to pivot. The armature is mounted on a flexure hinge that provides a low friction mounting and a restoring force to return the armature to an initial position. The flexure hinge also comprises the flexible conductor that provides current to the coil. The armature is opaque and an extension thereof defines an aperture/shutter blade.

In operation, the position of the actuator is determined by the average current applied to the coils. The current is controlled by pulse duration modulation, the current pulses being generated by a digital computer. The frequency of the pulses is selected to be above the cutoff frequency of the actuator. The aperture size is determined by the duty cycle of the pulses applied to the actuator and the shutter time is determined by the number of pulses applied to the actuator; the actuator itself acting as a digital-to-analog converter.

An improved control circuit for the planar electromagnetic actuator is disclosed in U.S. Pat. application Ser. No. entitled "Improved Method and Circuit for Controlling an Electromagnetic Actuator in Photographic Apparatus," filed on the same date as the present application in the name of L. F. Frank. The improved control circuit applies a pulse of a first polarity to the armature to quickly move it to a desired position, then applies a braking pulse of opposite polarity to stop the armature at the desired position. The control circuit applies a train of pulses, above the cutoff frequency of the actuator to hold the actuator in the desired position. To quickly return the actuator to the rest position, the control circuit applies a pulse to the armature to move it in cooperation with the resilient means to the rest position, then applies a pulse to brake the armature at the rest position.

A magnetostrictive position sensing device, particularly adapted for use with a digital controlled camera, is disclosed in U.S. patent application Ser. No. filed on the same date as the present application entitled "Magnetostrictive Position Sensing Device and Digitally Controlled Photographic Apparatus Incorporating Such Device" by D. Lambeth and assigned to the present Assignee. The position sensing device includes a magnetostrictive element such as a wire, a first electromagnetic transducer disposed with respect to the magnetostrictive element for transducing an acoustic pulse therein, and a second electromagnetic transducer disposed with respect to the magnetostrictive element for transducing the acoustic pulse, the first and second transducers being relatively movable with respect to each other, and a timer for measuring the propagation time of the acoustic pulse between the first and second transducers. The measured time represents the relative position of the transducers along the magnetostrictive element.

The position sensor can be used in a camera, for example to sense the position of a movable lens in an automatic focus servo.

The digitally controlled actuators and sensors noted above share the desirable features that they are simply and inexpensively constructed, and reliable. In addition, with careful tolerance on their manufacture, a high degree of accuracy and repeatability from transducer to transducer can be achieved. Unfortunately, the imposition of tight manufacturing tolerances on these otherwise simple and easily constructed digitally controlled devices increases the cost of manufacture, since the yield of useful devices is reduced and more expensive manufacturing techniques must be employed. Some of the inherent advantages of the devices, which were attractive in the first instance because of their economy of manufacture, are thereby sacrificed.

One solution to the problem of repeatability of operation, for example in a planar shutter actuator, is to employ a feedback system to monitor the position of the actuator armature. This solution again increases the cost of the apparatus, thereby diminishing its attractiveness.

The inventors therefore were faced with the problem of how to manufacture highly accurate, consistently uniform controllers for photographic cameras while realizing the economy inherent in the newly discovered digitally controlled actuators and sensors, and at the same time relax the manufacturing tolerances to increase the yield of useful devices and thereby decrease the manufacturing costs.

SOLUTION TO THE PROBLEM—SUMMARY OF THE INVENTION

The above noted problems were solved according to the present invention by providing a digital controller in a photographic camera comprising a microcomputer and one or more digital computer controlled input and output transducers such as scene-light measuring means, subject-distance measuring means, and means for controlling aperture size, shutter time or focus adjustment. The microcomputer receives inputs and controls the output transducers in response thereto according to a general control program stored in a computer memory. The controller includes a programable memory containing custom control constants for the specific controller in which it resides. According to a preferred embodiment of the invention, a high precision camera controller is produced by first making the above detailed photographic camera, then operating the camera under known operating conditions using a nominal operating program. The responses to the camera transducers under the known operating conditions and nominal operating program are measured and custom control constants are generated for the specific camera. The custom control constants are then programmed into the programable memory of the camera to bring its operation into conformity with desired parameters to complete the manufacture.

BRIEF DESCRIPTION OF THE DRAWINGS

The invention will be described with reference to the accompanying drawings, wherein.

DESCRIPTION OF THE PREFERRED EMBODIMENTS

Photographic cameras being well known in the art, only those parts relating directly to the present invention will be described in detail, the rest being selectable from those in the art.

Figure 1:
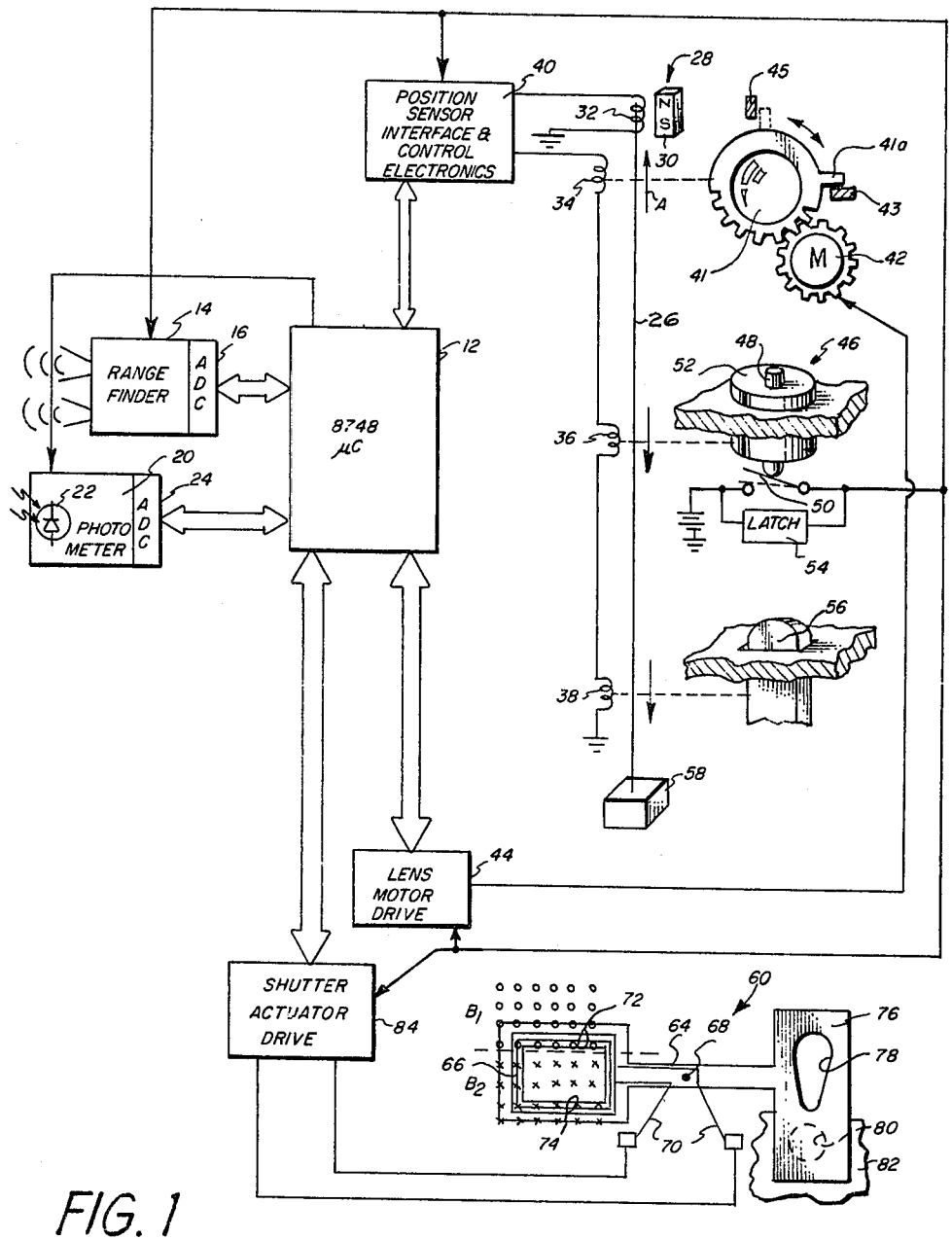
FIG. 1 is a schematic diagram of a digital camera controller embodying the principles of the present invention.

FIG. 1 is an overall schematic diagram showing a digital camera controller with a digitally controlled planar electromagnetic shutter actuator and a mangnetostrictive position sensor particularly adapted for use with a digital controller. The camera controller comprises a microcomputer 12 having a programable read-only memory (PROM). Such a microcomputer can be purchased on a single silicon chip from the *Intel Corporation* as their Model 8748 single chip microcomputer. The camera includes a range finder 14 connected to the microcomputer 12. The specific details of the range finder 14 are not shown since this element does not comprise a part of the present invention. Several of the presently known automatic range finding devices are suitable for use herein. See for example, the sonic range finding device disclosed in U.S. Pat. No. 3,522,764 entitled "Range Finding and Focusing System for Photographic Cameras and the Like," by C. H. Biber, granted Aug. 4, 1970; or the solid state range finding device disclosed in U.S. Pat. No. 3,945,023 entitled "Autofocus Camera with Solid State Range Finder," by N. L. Stauffer, granted Mar. 16, 1976. The range finding device 14 when signaled by the computer 12, determines the range to the main subject, i.e., that subject which is in a particular part of the picture, preferably designated by fiducial marks in the camera viewfinder. The range finding device generates a signal indicative of the distance to the main subject, and the signal is converted to a digital signal by analog-to-digital converter 16 for transmittal to the microcomputer 12.

The camera also contains a photometer 20 connected to microcomputer 12. The photometer includes a photosensitive element 22, such as a silicon photodiode, and suitable signal processing electronics for generating a signal proportional to the logarithm of the brightness of the main subject. The specific details of the photometer circuit are not shown, since the circuit does not constitute part of the present invention. A number of light-sensitive circuits employed in automatic exposure controlled systems are suitable for use herein, the only requirement being that the output signal is a monotonic function of the brightness of a main portion of the scene. The scene brightness signal is converted to a digital signal suitable for use by the microcomputer by analog-to-digital converter 24, and is supplied in digital form to the microcomputer 12 in a known manner.

A magnetostrictive position sensing device such as that described in the copending application of D. Lambeth entitled "Magnetostrictive Position Sensing Device and Digitally Controlled Photographic Apparatus Incorporating Such Device," Ser. No., filed on even date herewith comprises a magnetostrictive element such as a wire of magnetostrictive material 26. A first electromagnetic transducer, generally designated 28, for launching an acoustic pulse in wire 26, includes a coil 32 and a bias magnet 30, and is relatively fixed with respect to wire 26.

A plurality of relatively movable electromagnetic transducers comprising series connected coils 34, 36, and 38 are adapted for sensing the acoustic pulse in the wire. A position sensor interface and control electronics 40 connected to relatively fixed electromagnetic transducer 30 and relatively movable transducers 34, 36 and 38, includes means for measuring the elapsed time between the launch of an acoustic pulse by transducer 28 and the sensing thereof by one of the transducers 34, 36, or 38. The position sensor interface and control electronics 40 is connected to the microprocessor 12. The measured time between launching and detecting an acoustic pulse in wire 26, represented as a digital count, is proportional to the distance between the pulse sending transducer 28 and one of the pulse sensing transducers 34, 36 or 38. The control electronics 40 distinguishes between the pulses received from the respective sensing coils 34, 36, or 38 by employing a time window that is specific to each sensing coil. The sensing of a pulse is disabled until the window is opened. Prior to each operation of the position sensor, the microcomputer 12 initializes the control electronics 40 with the appropriate window for the particular sensing coil whose position is to be sensed. Then, upon command from the microprocessor 12, the control electronics 40 launches an acoustic pulse in the wire and starts a timer/counter. After the window is opened, the next pulse received from the sensing coils stops the timer. The count stored in the timer, representing the position of the sensor, is then transmitted to the microprocessor 12. Thus, to control the position sensing device, the program in the microprocessor must contain information regarding the time location of the window for each sensor, and information relating the count accumulated by the control electronics to the sensor positions.

Three movable camera elements are connected to the three relatively moving sensing coils 34, 36 and 38. An automatic focus mechanism includes an adjustable lens element 41 driven by a motor 42. Lens element 41 defines a projection 41a, and can be driven clockwise into a stop 43 that defines the infinity focus position of the lens, or counterclockwise into a stop 45 that defines a near focus position (e.g. 2 feet). Lens element 41 is mechanically coupled to sensing coil 34, and when lens element 41 is driven, for example, in the clockwise direction, coil 34 moves along wire 26 in the direction of arrow A. Motor 42 is controlled by the microprocessor 12 through a lens motor driver circuit 44. A body release button generally designated 46 includes an internal portion 48 adapted to engage and close a main power switch 50, and an external portion 52 mechanically coupled to the second sensing coil 36. Connected in parallel with main power switch 50 is an electronic latch 54 that holds power on for a predetermined time after main power switch 50 is opened to allow computer 12 to complete a photographic cycle.

A cartridge notch sensor includes a movable sensor member 56 that is mechanically connected to the third sensing coil 38. Sensor member 56 is adapted to be engaged by a flange on a film cartridge for introducing encoded information about the film in the cartridge into microcomputer 12. At the end of magnetostrictive wire 26, is an acoustic damper 58 that suppresses reflections of the acoustic pulse from the end of the wire.

The camera includes a shutter/aperture actuator mechanism generally designated 60 of the type disclosed in U.S. patent application Ser. No. 219,168 filed Dec. 22, 1980 in the name of J. K. Lee and assigned to the present Assignee. The shutter/aperture actuator mechanism includes an armature 64 formed from a sheet of opaque insulating material and having a planar coil 66 formed on the armature by photofabrication techniques. The armature is mounted for pivotal movement about a point 68 by a flexure hinge 70. Flexure hinge 70 comprises two legs of springy conductive material providing the electrical contact to coil 66. Coil 66 defines first and second legs 72 and 74 generally perpendicular to the direction of movement of the coil about pivot point 68. Oppositely directed magnetic fields $B_1$ and $B_2$ are generated by a pancake magnet (not shown) that is suspended over the coil. Leg 72 of coil 66 resides in field $B_1$ and leg 74 resides in field $B_2$.

Armature 64 forms an aperture blade 76 defining a tapered aperture 78 for progressively uncovering a fixed aperture 80 in a mechanism plate 82 (partially shown).

When current is applied to coil 66 under control of the microcomputer by a bidirectional shutter actuator driver 84, the electromagnetic forces generated on legs 72 and 74 cause armature 64 to pivot about point 68 to progressively uncover aperture 80. The extent of uncovering is determined by the amount of current flowing through coil 66. When current ceases to flow in planar coil 66, flexure hinge 70 returns the actuator to its original position.

If position control is attempted by merely controlling the amount of current supplied to the actuator, static friction perturbs the final position achieved by the armature, resulting in position error. The effects of static friction are overcome, and a more reliable, repeatable position control is achieved by applying a driving current in pulses of constant amplitude. This technique provides a small dither signal that breaks the remaining static friction of the actuator. The frequency of the pulses in the control signal is chosen to be somewhat above the cutoff frequency on the frequency versus response curve of the actuator. The pulse duration is modulated to control the aperture size, and the number of pulses applied to the actuator controls the shutter time.

An improved shutter driving circuit for the planar electromagnetic actuator is disclosed in U.S. patent application Ser. No. filed on even date herewith in the name of L. F. Frank. The shutter driving circuit applies a series of fifty percent duty cycle positive and negative voltage "leader" pulses to the coil 66. The frequency of the "leader" pulses is above the cutoff frequency of the actuator, for breaking the static friction of the actuator. The control circuit then applies an "open" pulse to the conductor for moving the armature against the force of the resilient means to a selected position away from the rest position. The control circuit then applies a "brake" pulse to the conductor for braking the actuator at the selected position. The control circuit applies a plurality of "hold" pulses to the conductor to hold the armature at the selected position, the duty cycle of the "hold" pulses being a function of the desired position of the actuator. The control circuit then applies a "close" pulse to the conductor for rapidly moving the armature in cooperation with the resilient means to the rest position, and then applies a "brake" pulse to the conductor for braking the armature at the rest position.

As described above, the control circuit produces a waveform consisting of four parts, a series of "leader" pulses prior to opening the shutter to break the static friction and settle the shutter actuator into position, a rapid opening motion comprising a pulse of a first polarity and a pulse of opposite polarity to open the shutter and bring it to rest in the open position, a period of "hold" pulses to hold the actuator in position, and a rapid closing motion comprising a pulse of one polarity and a pulse of opposite polarity to close and park the shutter at its rest position.

The opening motion has two components, a positive pulse to produce opening acceleration and a negative pulse to produce braking acceleration. The duration of the positive pulse is approximately a linear function of the distance or stroke that the armature must be moved, and is of the form:

$$T_1 = (K_1 \times S) + K_2, \tag{1}$$

where
T$_1$ is the time duration of the opening pulse;
S is the desired stroke or distance that the armature must be moved; and
K$_1$ and K$_2$ are constants.

This equation is an empirically derived relationship between the time T$_1$ and the desired stroke S, and is related to the moments of inertia, spring constants and damping characteristics of the shutter. The opening stroke is mostly determined by the length of this positive pulse. The negative braking pulse decelerates the armature to leave it stationary at the desired position. This force is in the same direction as the spring force on the armature and thus has a somewhat more complex form. Tests show a pronounced second derivative in the braking time T$_2$ of the armature. An empirically derived formula for modeling the behavior of the shutter during braking is:

$$T_2 = (-K_3 \times S^2) + (K_4 \times S) + K_5 \tag{2}$$

where
T$_2$ is the time duration of the braking pulse; and
K$_3$–K$_5$ are constants.

The duty cycle required to hold the armature in the desired position is very nearly a linear function of the distance that the armature must move and is molded by the equation:

$$T_3 = (K_6 \times S) + K_7 \tag{3}$$

where
T$_3$ is the time duration of the positive portion of the hold pulses; and
K$_6$ and K$_7$ are constants.

The closing cycle components are similar to the opening cycle, the negative closing pulse tends to be linear with distance or stroke and is modeled by the equation:

$$T_4 = (K_8 \times S) + K_9 \tag{4}$$

where
T$_4$ is the time duration of the closing pulse; and
K$_8$ and K$_9$ are constants.

The positive closing braking pulse is determined by the rest position and is modeled by the following equation:

$$T_5 = (K_{10} \times S) + K_{11} \tag{5}$$

where
T$_5$ is the time duration of the closing braking pulse; and
K$_{10}$ and K$_{11}$ are constants.

Figure 2A:
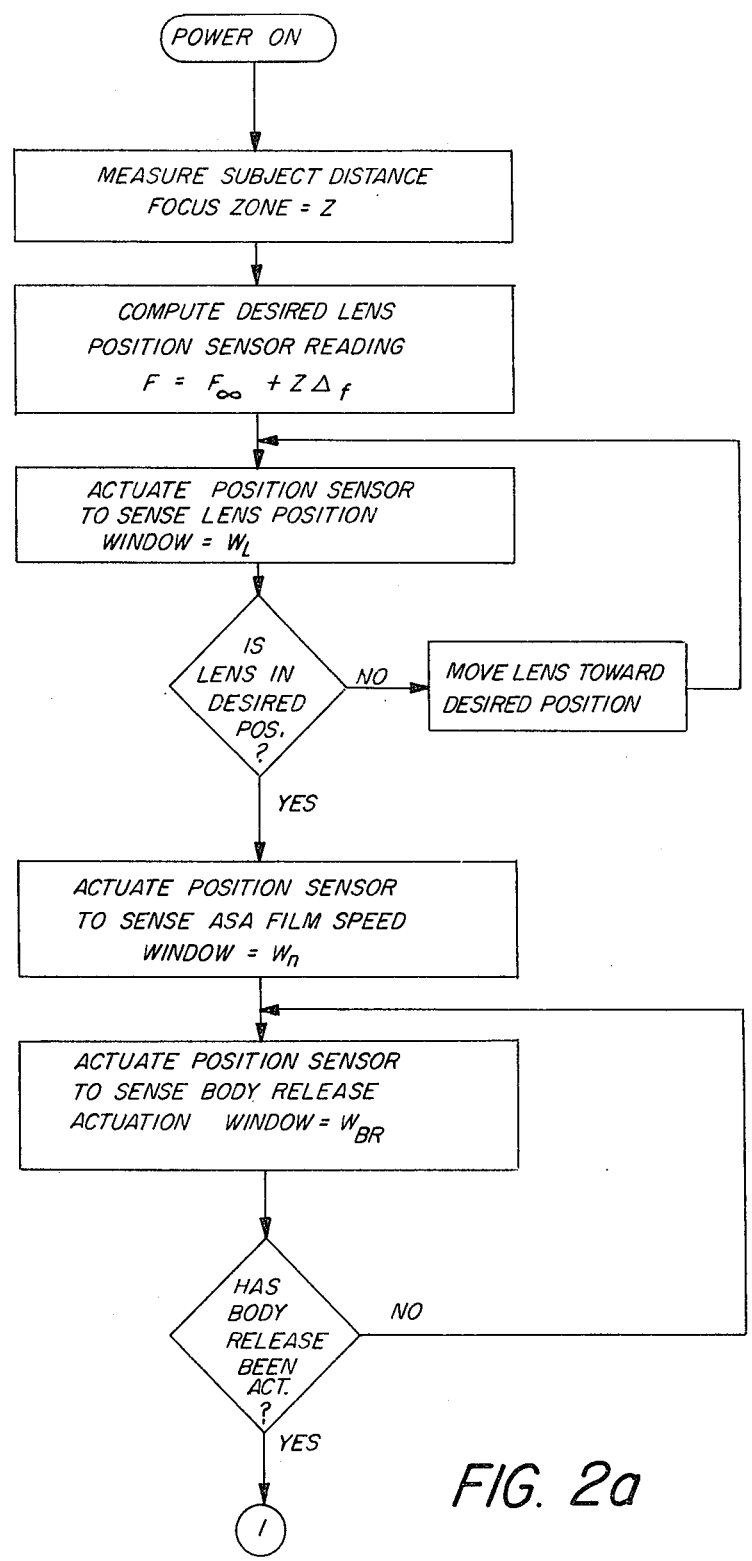
FIG. 2a–b is a flow chart for programing the digital computer in the camera controller shown in FIG. 1.
Figure 2B:
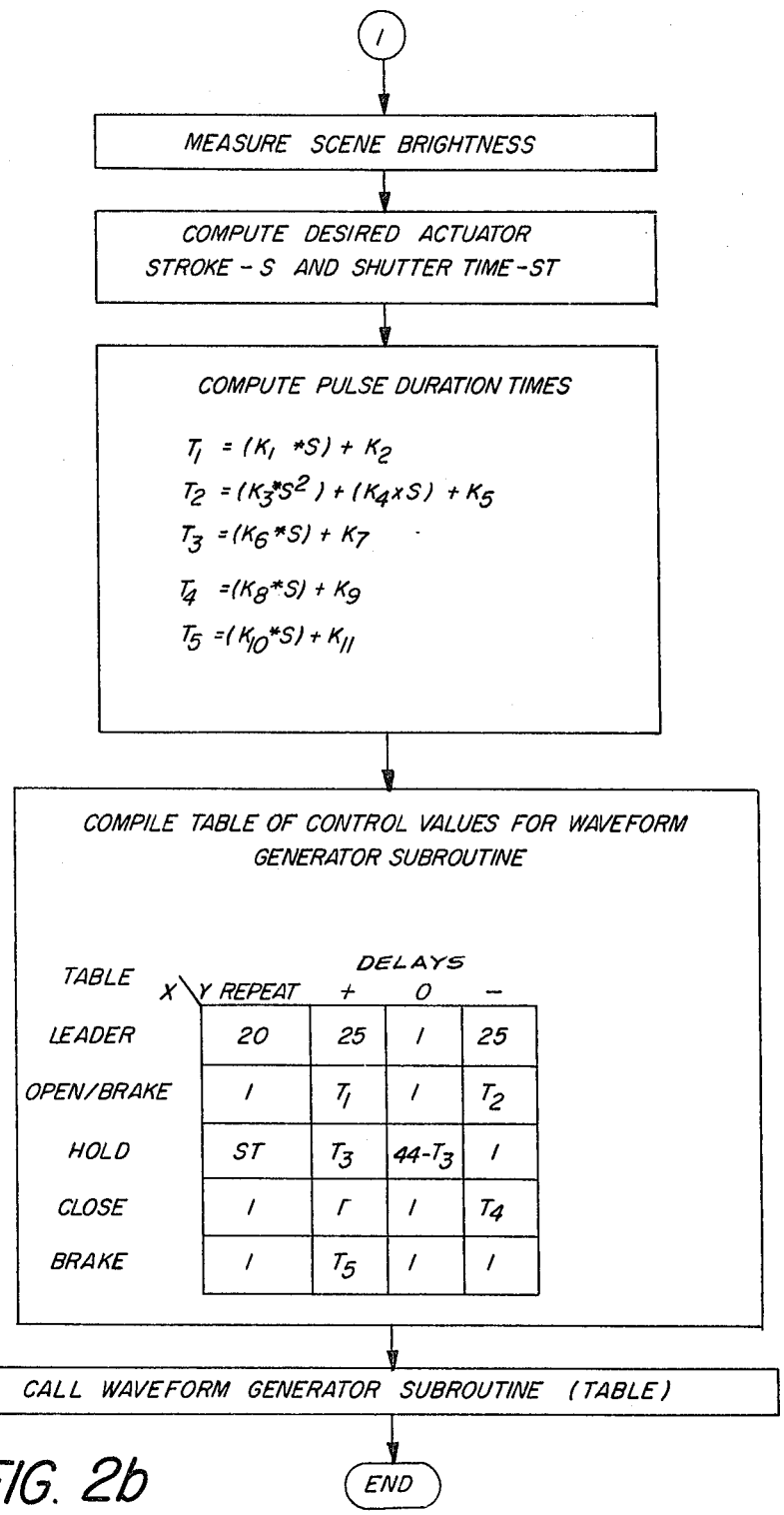

The operation of the camera under microcomputer control will now be described. A flow chart for programing the microcomputer 12 to control the position sensors and shutter actuators shown in FIG. 1, employing the shutter actuator modeling equations described above, is shown in FIGS. 2a–c.

First the microcomputer 12 measures the subject distance by commanding the range finder 14 to make a measurement, and then sampling the output of the A-D converter 16. The output of the A-D converter is a number Z (for example from 1–8, if a three-bit information word is employed) indicating a zone of distance in which the subject lies. The distance is used to compute a desired sensor count for the lens position sensor according to the following equation:

$$F = F_\infty + (Z \times \Delta f); \tag{6}$$

where
F is the desired sensor reading;
F$_\infty$ is the position sensor reading at infinity focus;
Z is the output of the range finder; and
$\Delta f$ is the width of the corresponding zone of focus on the lens position sensor.

The position sensor is operated to determine the position of the lens. The actual count measured is compared with the desired count to see if the lens is in the proper zone of focus, if not, the lens is moved toward the proper focus by signaling lens motor drive 44 to drive the lens motor 42 toward the desired focus position. The lens position is monitored until the proper position is achieved. Next, the computer signals the position sensor to measure the position of the cartridge notch sensor to determine the ASA speed of the film in the camera. The film speed is computed using constants stored in the programable memory.

The computer senses the position of the body release member and tests the position until an actuation is detected. Then the computer measures the scene brightness by commanding the photometer 20 to make a measurement, and samples the output of the A-D converter 24. The measured scene brightness B$_s$ is employed to calculate a desired actuator stroke S and shutter time ST using a conventional exposure control equation. Next, the pulse duration times T$_1$–T$_5$ are calculated according to equations 1–5 above, using the control constants K$_1$–K$_{11}$ in programable memory. The pulse duration times are then employed to compute a table of control values used by a Waveform Generator Subroutine to generate the control signals for shutter actuator drive 84.

Figure 3:
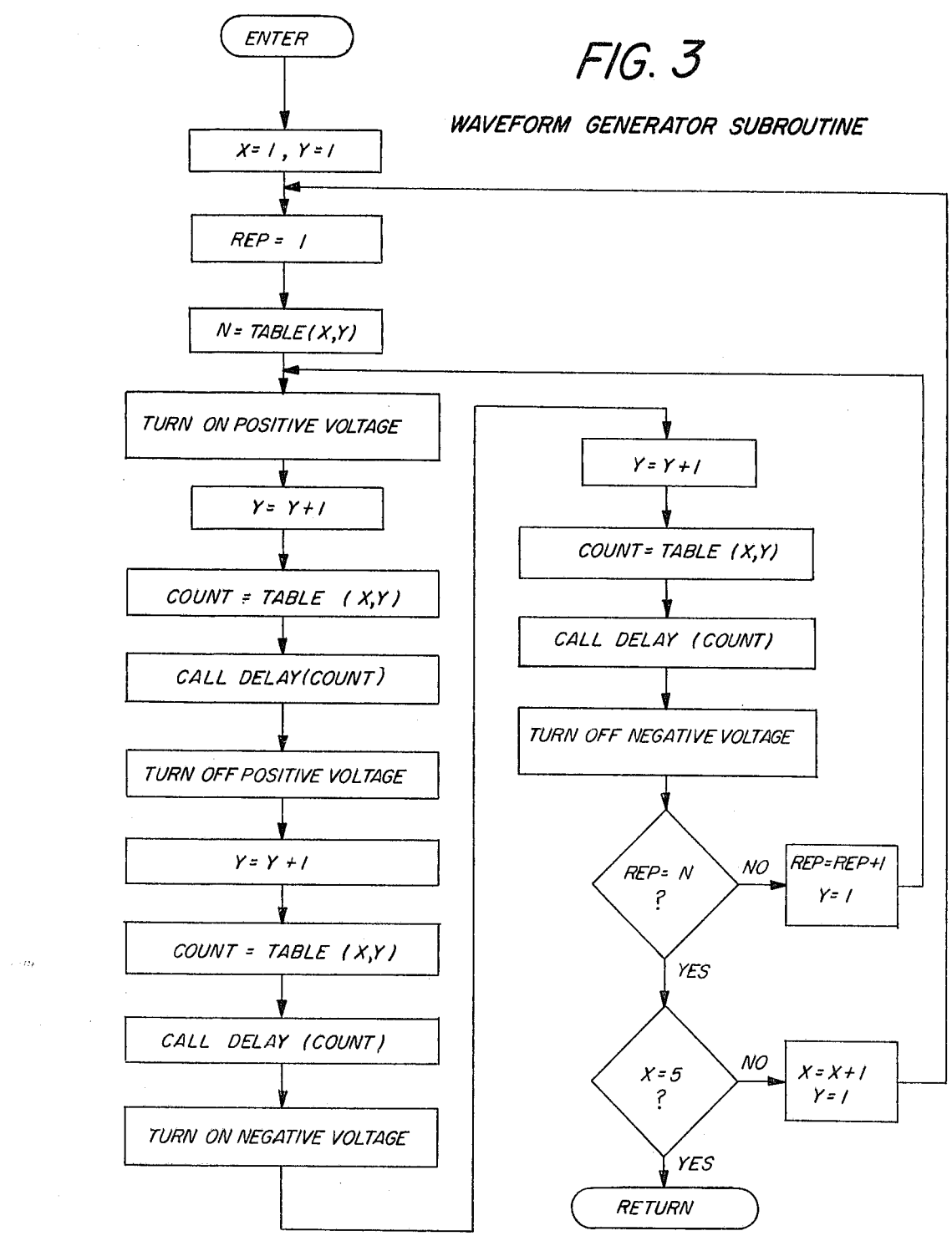
FIG. 3 is a flow chart of a Waveform Generator Subroutine in the camera control program shown in FIG. 2a–b.
Figure 4:
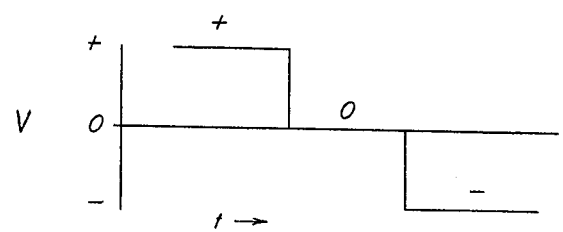
FIG. 4 is a diagram of a waveform subunit employed to generate a shutter actuator control waveform is the Waveform Generator Subroutine shown in FIG. 3.
Figure 5:
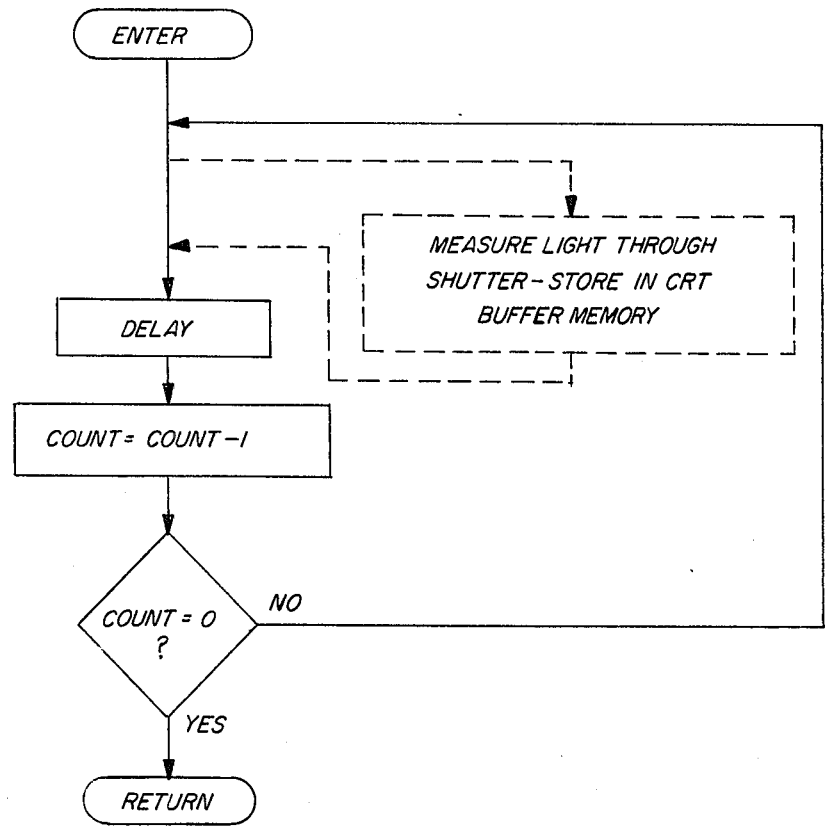
FIG. 5 is a Time Delay Subroutine employed in the Waveform Generator Subroutine shown in FIG. 3.

A flow chart of the Waveform Generator Subroutine is shown in FIG. 3. The Subroutine constructs a shutter control waveform by compiling multiple repetitions of a basic waveform subunit, shown in FIG. 4. The basic waveform subunit includes a positive portion (+), a zero portion (0), and a negative portion (−). During the positive portion of the waveform subunit, the microcomputer 12 commands the shutter actuator driver 84 to apply a positive voltage across the shutter actuator 60. During the zero portion of the waveform subunit, the microcomputer 12 commands driver 84 to apply no voltage across the shutter actuator. During the negative portion of the subunit, the microcomputer commands driver 84 to apply a negative voltage across the shutter actuator. The duration of each portion of the basic waveform subunit is controlled by a Delay Subroutine shown in FIG. 5. When the Delay Subroutine is called, a variable quantity COUNT is set between 1 and 255. The Delay Subroutine loops through a delay step (e.g. 0.1 milliseconds) comprising a fixed multiple of the microcomputer clock period. The number of loops through the delay step is determined by COUNT which is decremented each time through the loop, until COUNT equals zero. Control is then returned to the Waveform Generator Subroutine. The various control values required to generate the shutter/aperture actuator control waveform are compiled by the main program and stored in a Table (TABLE X,Y) having five rows and four columns. The first row of the Table (X=1), shown in FIG. 2b, contains the control values for generating the "leader" portion of the shutter control waveform comprising a 50 percent duty cycle positive and negative pulse train.

The 1st column (Y=1) of the Table contains the number of times that the waveform subunit is to be repeated (e.g. twenty times for the "leader" portion of the waveform). Column 2 (Y=2) contains the delay COUNT (e.g. 25) for the positive portion of the waveform subunit. Column 3 (Y=3) contains the delay COUNT (e.g. 1) for the zero portion of the waveform subunit, and Column 4 (Y=4) contains the delay COUNT (e.g. 25) for the negative portion of the waveform subunit. The second row of the Table (X=2) contains the control values for generating the positive "open" pulse and the negative "braking" pulse. As shown in the Table in FIG. 2b, the values in Columns 2 and 4 are the calculated times $T_1$ and $T_2$ expressed as multiples of the delay steps of the Delay Subroutine.

The third row of the Table (X=3) contains the control values for generating the "hold" pulses in the actuator control waveform. The number of repetitions is determined by the desired shutter time ST. The values of control constants $K_6$ and $K_7$ are chosen such that the shutter time ST is expressed as a multiple of one full cycle of a hold pulse (e.g. 44 delay loops). The positive and zero portions of the waveform subunit are determined by the times $T_3$ and $(44-T_3)$ respectively. The fourth row of the Table (X=4) contains the control values for generating the negative closing pulse. The duration of the negative portion of the waveform subunit is the calculated time $T_4$. The fifth row of the Table (X=5) contains the control values for generating the positive braking pulse. The duration of the positive portion of the waveform subunit is the calculated time $T_5$. Computed control values for producing a typical shutter actuation are shown in Table I below:

TABLE I

| TABLE X\Y | REPEAT | DELAYS + | 0 | − |
|---|---|---|---|---|
| LEADER | 20 | 25 | 1 | 25 |
| OPEN/BRAKE | 1 | 40 | 1 | 30 |
| HOLD | 20 | 10 | 40 | 1 |
| CLOSE | 1 | 1 | 1 | 30 |
| BRAKE | 1 | 20 | 1 | 1 |

The Waveform Generator Subroutine, shown in FIG. 3, sets internal counters X, Y and REP equal to 1. It then sets a constant (N) equal to the first value in the first row in the Table using a pointer TABLE (X,Y) to select the entry from the Table. Next, it turns on the positive voltage by sending the appropriate command to shutter actuator drive 84 (see FIG. 1). Y is incremented by one, thereby causing TABLE (X,Y) to point to the second value in the first row of the Table. A variable (COUNT) is set equal to the indicated value in the Table. The Delay Subroutine (FIG. 5) is called, and a delay proportional to the value of COUNT is executed. The positive voltage is turned off, the pointer is stepped to the next location in the Table, and the Delay Subroutine is called once more. Finally, the negative voltage is turned on; the pointer is stepped; and the Delay Subroutine is called to complete the first basic waveform subunit. After the first subunit is completed, the counter REP is checked to see if the required number of repetitions of that waveform subunit have been performed. If not, the program increments REP; sets Y=1; and repeats the waveform subunit. If the required number of repetitions have been performed, the program checks to see if the waveform generation is complete; if not, it increments X, sending the program to the next row in the Table; resets Y=1; and returns to the start of the program. When the waveform generation is complete, the subroutine returns to the main program.

Figure 6:
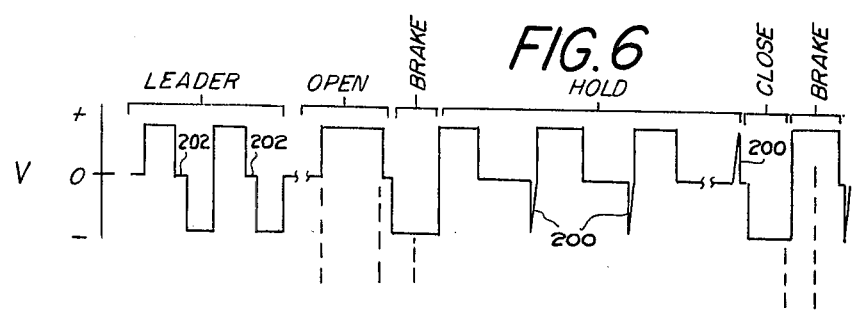
FIG. 6 is a waveform diagram showing a typical shutter actuator control waveform generated by the Waveform Generator Subroutine shown in FIG. 4.

The control voltage waveform produced by the Waveform Generator Subroutine using the control values in Table I, is shown in FIG. 6. The positive and negative voltage spikes 200 and the small plateaus of zero voltage 202 are merely vestiges of the particular method employed for generating the voltage waveform, and have no effect on the operation of the actuator. The control constants employed by the camera control program are listed in the following Table:

TABLE II

| | |
|---|---|
| $W_L$ | The window for the lens position sensor. |
| $F_\infty$ | The position sensor reading when the lens is positioned at infinity focus. |
| $\Delta_f$ | The width of a zone of focus on the position sensor. |
| $W_{BR}$ | The window for the body release position sensor. |
| $P_{off}$ | The position sensor reading when the body release is not actuated. |
| $P_{on}$ | The position sensor reading when the body release sensor is actuated. |
| $W_n$ | The window for the cartridge notch sensor position. |
| $N^1$ | The position sensor reading when the cartridge notch sensor is not depressed. |
| $N^2$ | The position sensor reading when the cartridge notch sensor is depressed. |
| $K^1$-$K^{11}$ | The shutter actuator control constants. |

Using an exemplary shutter picked at random from a group of experimental shutters, the nominal values of the control constants, $K_1$-$K_{11}$ were determined empirically. These nominal constants were then employed in a control program to exercise several shutters. The relative error between commanded position, and achieved position varied from shutter to shutter by about one stop. In order to reduce the variability in shutter performance from camera to camera, it is desirable to custom program each shutter individually to provide the optimum values of the control constants $K_1$-$K_{11}$ for each shutter.

According to the present invention, the camera is calibrated as a finishing assembly step, by exercising the camera under known photographic conditions using a control program with nominal operating constants, measuring the response of the camera mechanism to the known photographic conditions and the nominal operating constants, calculating custom tailored operating constants for the specific camera, and programing a programable, read-only memory in the camera with the custom tailored operating constants using external programing equipment.

Figure 7:
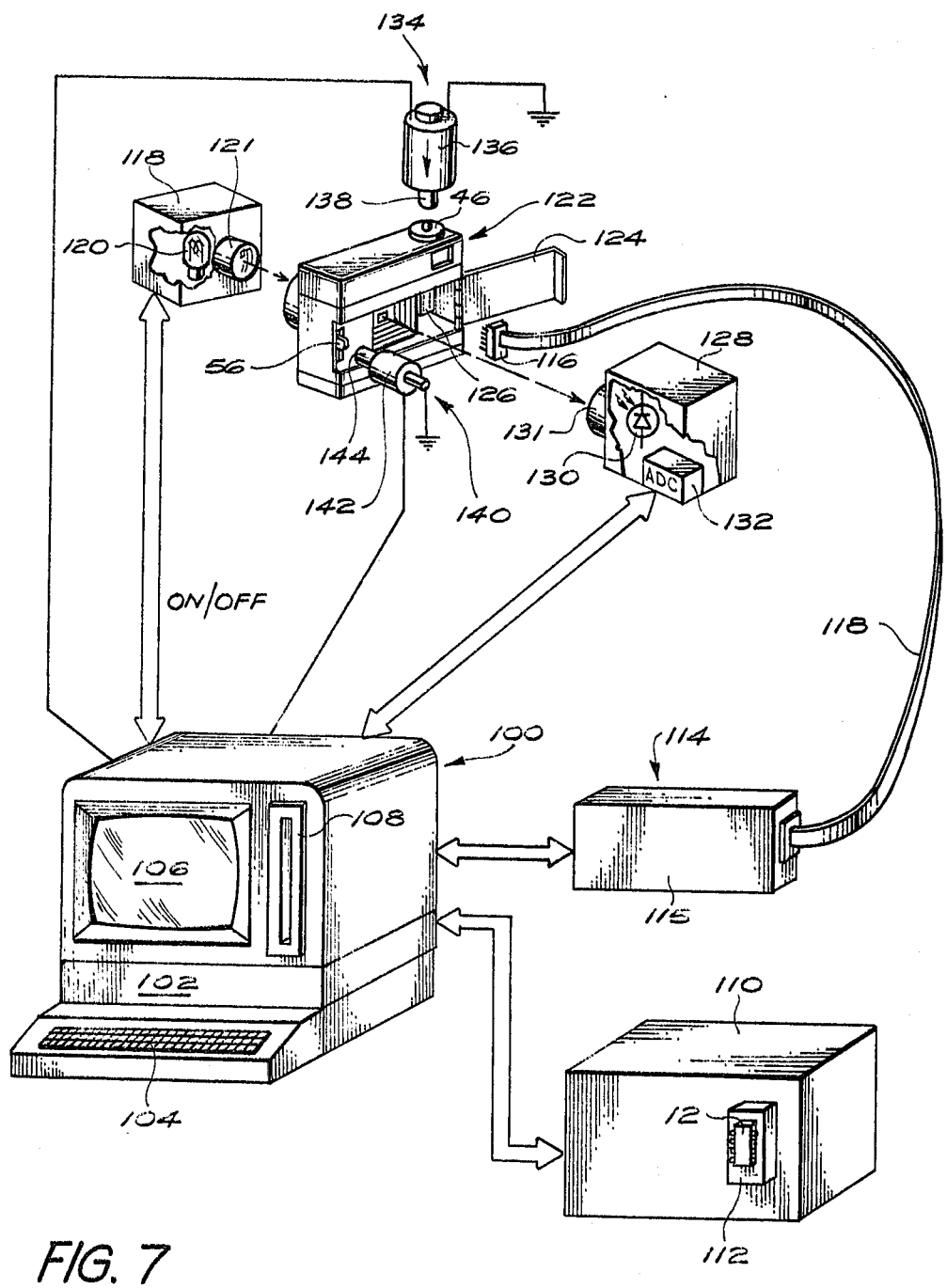
FIG. 7 is a schematic diagram of an automatic calibration system employed according to the present invention.

A customized program for a camera having a digital controller such as that shown in FIG. 1 is produced according to the present invention by the automatic calibration system shown in FIG. 7. The calibration system comprises a main control computer 100, including a central processing unit 102, a keyboard input 104, CRT display 106, and a floppy diskette drive 108. This computer system, with built-in interfaces required for the peripheral equipment used can be purchased as an integrated system. For example, the Model 120 Intellec• Series II Microcomputer Development System from Intel Corporation. The calibration system further includes a programable memory programmer 110, such as the Universal PROM Programmer sold by the Intel Corporation, which is plug compatible with the microcomputer development system. The memory programmer 110 features a socket 112, into which a programable memory, or a microcomputer having a programable memory, such as the Intel 8748 Microcomputer 12, is inserted for programing. The calibration system includes an emulator 114 that emulates the behavior of a microcomputer such as the Intel 8748. The emulator includes an electronic interface package 115 and a physical interface comprising a plug 116 on a flexible cable 118. The plug is adapted to fit into a mounting socket for the Intel 8748 Microcomputer. An emulator that emulates the Intel 8748 Microcomputer and is plug compatible with the Intellec• Microcomputer Development System, is the ICE-49 MCS48 In-Circuit Emulator sold by the Intel Corporation.

The automatic calibration system includes a light source 118, having a regulated power supply (not shown), an incandescent bulb 120, and suitable optics 121 for projecting light onto the optics of a camera undergoing calibration. The light source 118 is connected to the main control computer, and the computer can turn the light on and off. The camera being programed, generally designated 122, is shown with its back 124 hinged open to reveal a mounting socket 126 for the Intel 8748 microcomputer. With the microcomputer removed from the socket, the plug 116 of In-circuit Emulator 114 is inserted into the socket. The camera may then be controlled by the main control computer 100 through emulator 114.

Light from light source 118 that passes through the camera is measured by a photometer 128, which includes a light-sensitive element such as a photodiode 130, suitable optics 131 for directing light onto the photodiode 130, conventional sensing and amplification circuitry (not shown), and an A-D converter 132, which is connected to main control computer 100. The calibration system also includes an electromechanical actuator 134 having a solenoid coil 136 and a plunger 138. Actuator 134 is electrically connected to the main control computer and is adapted, when energized by the control computer, to exercise the camera body release button 46. Another electromagnetic actuator 140 includes a solenoid coil 142 and a plunger 144, and is likewise connected to the main control computer for exercising the film cartridge notch sensor 56.

Figure 8:
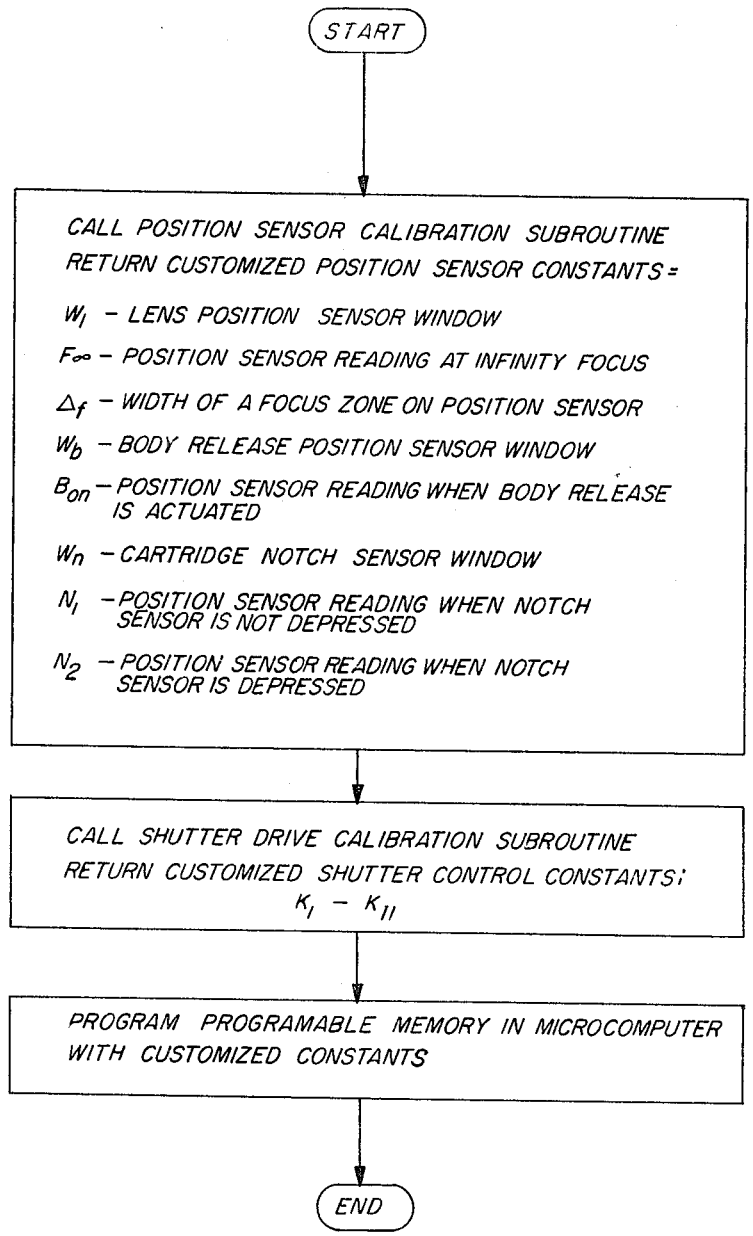
FIG. 8 is a flow chart for programing the automatic calibration system to custom tailor the camera controller according to the present invention.

A flow chart for programing the main control computer 100 to automatically calibrate the camera 122 is shown in FIG. 8. First the position sensor is calibrated to determine the sensor windows $W_L$, $W_{BR}$ and $W_n$, the position sensor reading at infinity focus ($F_\infty$), the width of a focus zone on the position sensor ($\Delta_f$), the position sensor reading for the body release member in the actuated position $B_{on}$, and the cartridge notch sensor positions $N_1$ and $N_2$. Next, the shutter/aperture actuator driver is calibrated to determine the eleven control constants $K_1$–$K_{11}$ used in the shutter control program. Finally, all these custom control constants are programed into the programable memory in the microcomputer 12.

Figure 9A:
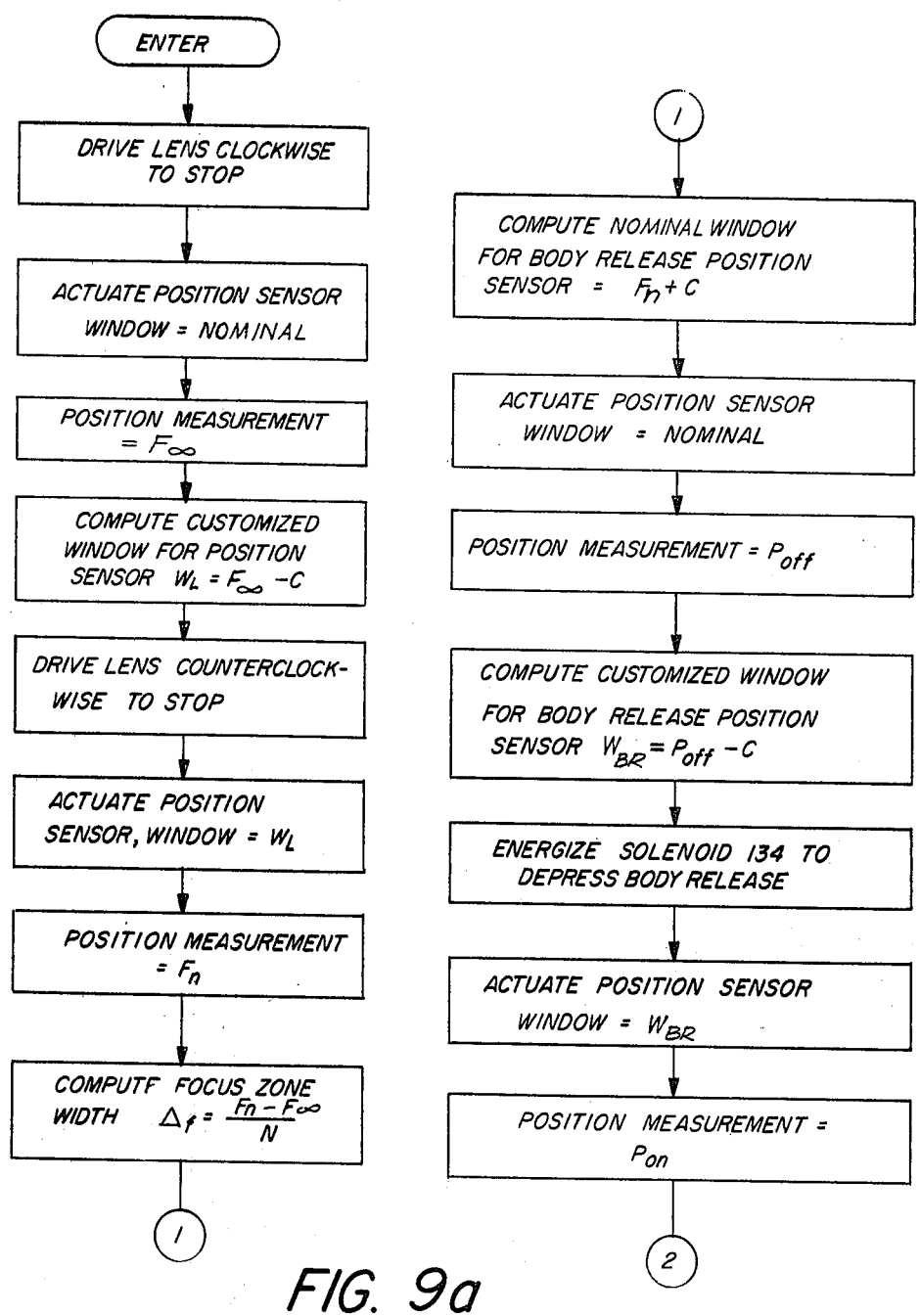
FIG. 9a–b is a flow chart of a position sensor calibration subroutine employed by the automatic calibration program shown in FIG. 8.
Figure 9B:
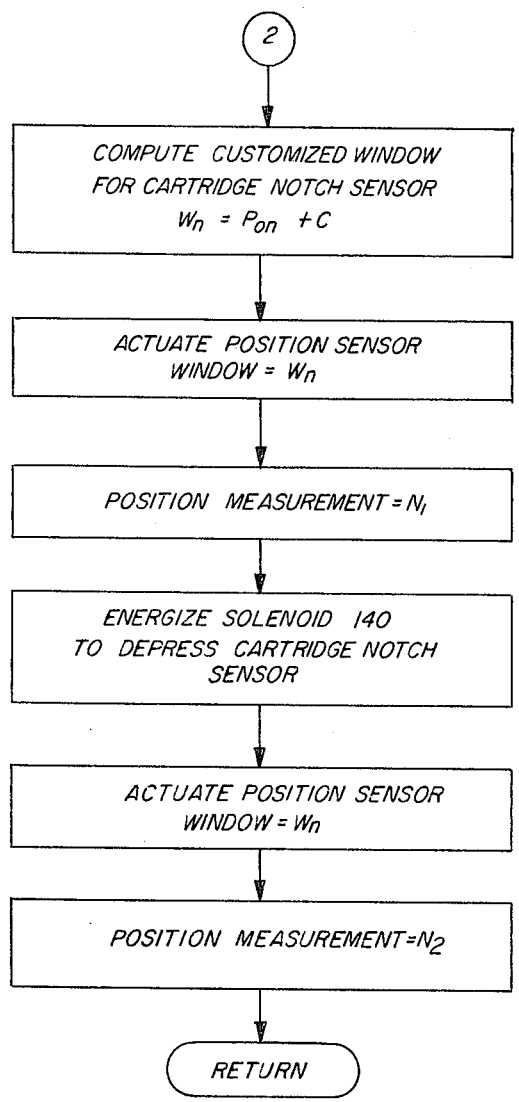

FIG. 9 is a flow chart of the position sensor calibration subroutine. To calibrate the position sensor, first the computer signals lens motor driver 44 to drive lens 41 clockwise into a mechanical stop 43 (see FIG. 1) set at the infinity focus position of the lens, thereby moving lens sensing coil 34 in the direction of arrow A in FIG. 1. Next, a nominal window for the location of sensing coil 34 is sent to the position sensor interface and control electronics 40. The position sensor is actuated, and the lens position measured. The resulting measurement $F_\infty$ is the position sensor reading when the lens 41 is focused at infinity. A customized window $W_1$ for the lens position sensor is computed by subtracting a constant C from $F_\infty$. Next, the lens 41 is driven counterclockwise into a mechanical stop 45 set at the near focus position (e.g. 2 feet). The lens position sensor is again actuated and the near focus lens position $F_n$ is measured. The width of a zone of focus on the lens position sensor $\Delta_f$ is then computed as:

$$\Delta_f = \frac{F_n - F_\infty}{N} \tag{7}$$

where
  N is the number of focus zones measured by the range finder 14 (e.g. 8).

Next, a nominal sensor window ($F_n$+C) for the body release sensor is computed by adding a constant C to the position sensor reading for the near focus position. The position sensor is operated using the nominal sensor window. The position measurement $P_{off}$ is the position sensor reading when the body release member is not actuated. A customized sensor window $W_{BR}$ is computed for the body release sensor as:

$$W_{BR} = P_{off} - C. \tag{8}$$

The computer then energizes solenoid 134 (see FIG. 7), to depress the body release member; sends the body release sensor window $W_{BR}$ to the position sensor interface and control electronics; and actuates the position sensor. The measured position $P_{on}$ is the position measurement when the body release member is depressed. A nominal window $P_{on}$+C for the cartridge notch sensor is computed by adding a constant C to the measured position $P_{on}$. The position sensor is operated using the nominal window and the position is measured. The position $N_1$ is the position sensor reading when the cartridge notch sensor is not depressed. A customized window $W_n$ is computed for the cartridge notch position sensor by subtracting a constant C from the position sensor reading $N_1$.

The computer then energizes solenoid 140 to depress the cartridge notch sensor; loads the customized window $W_n$ in the position sensor interface and control electronics; and actuates the position sensor. The position measurement $N_2$ is the position sensor reading when the cartridge notch sensor is depressed. The position calibration sensor subroutine returns the following customized operating constants to the main calibration program:

$W_L$, $F_\infty$, $\Delta_f$, $W_{BR}$, $P_{on}$, $W_n$, $N_1$, and $N_2$

Figure 10A:
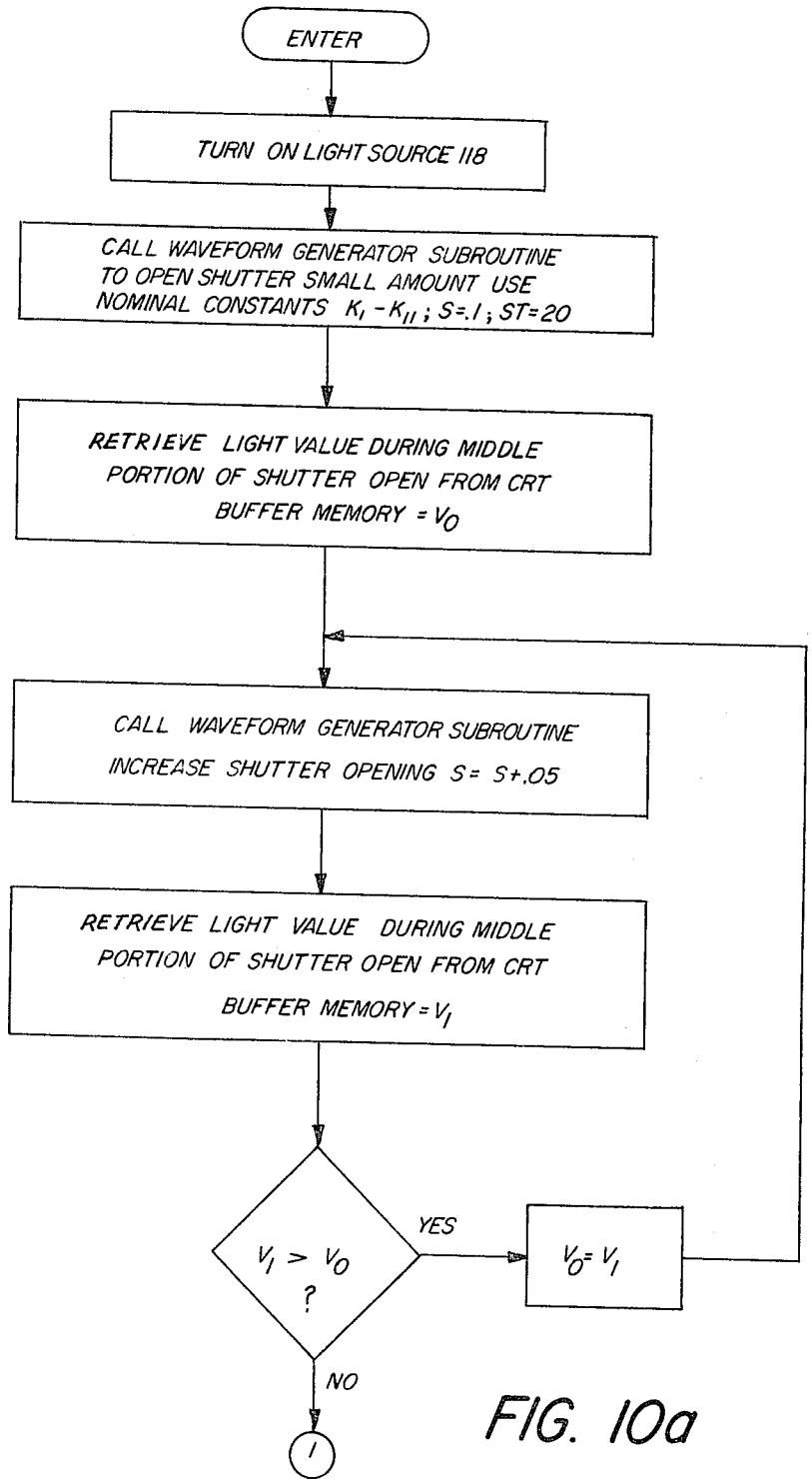
FIG. 10a–b is a flow chart of a shutter actuator calibration subroutine employed by the automatic calibration program shown in FIG. 8.
Figure 10B:
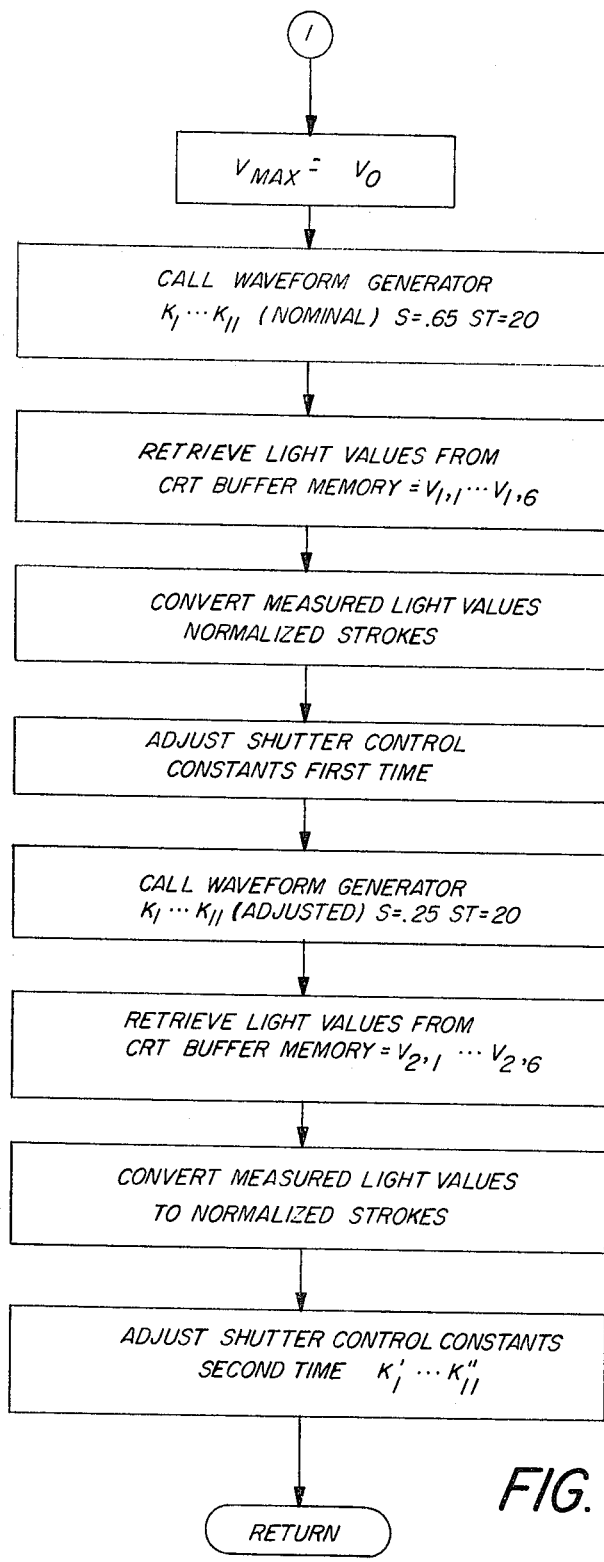

FIG. 10 is a flow chart of the shutter calibration subroutine. The first step in the calibration of the shutter actuator is to determine the output of photometer 128 with light source 118 on and the shutter open to its maximum aperture. To do this, the main control computer turns on the light source 118 and commands the shutter to open a small amount, using the Waveform Generator Subroutine shown in FIG. 3, and nominal control constants $K_1$-$K_{11}$.

The Delay Subroutine used by the Shutter Calibration program is a slightly modified version of the Delay Subroutine described above with respect to the camera control program. For the Shutter Calibration program, a light measurement step (shown by phantom lines in FIG. 5) is inserted in the subroutine. The light coming through the shutter is sampled once each time through the delay loop. The measured values are stored temporarily in a buffer memory associated with the CRT display. When program control is returned from the Waveform Generator Subroutine, the CRT memory buffer is selectively interrogated to retrieve photomeasurements from predetermined portions of the shutter profile. After the first shutter opening, a light measurement from the central portion of the shutter profile is retrieved from the buffer memory and stored temporarily as a variable $V_0$ (where V indicates the voltage output of photometer 128). The shutter is again commanded to open to a slightly larger opening, and the output of the photometer 128 is again retrieved. The measured value is temporarily stored as $V_1$. The computer compares $V_1$ to $V_0$ to see if $V_1$ is greater. If it is, $V_0$ is set to $V_1$; the shutter opening is further increased; and the output of the photometer is retrieved again. These steps are repeated until a measurement $V_1$ is less than the previous measurement $V_0$, thereby indicating that the shutter has just passed its maximum opening. The previous measurement $V_0$ is then stored as a variable $V_{max}$.

Figure 11:
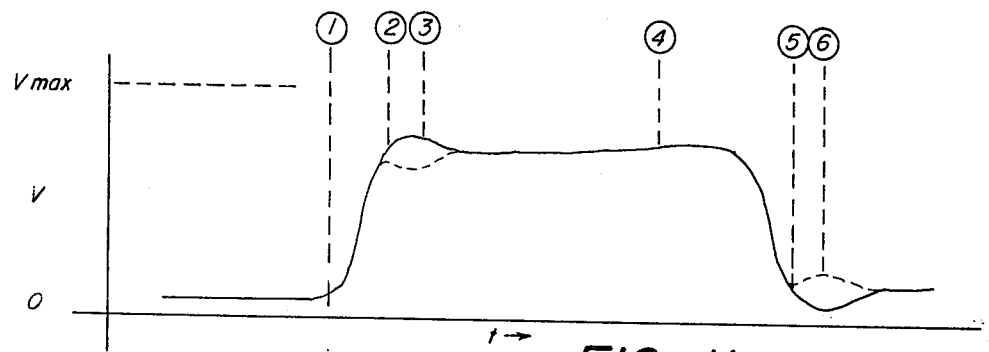
FIGS. 11 and 12 are waveform diagrams showing shutter opening profiles, and are useful in describing the shutter actuator calibration program shown in FIG. 10.

Using nominal control constants $K_1$-$K_{11}$, a first set of pulse duration times $T_{1,1}$-$T_{1,5}$ are calculated using equations (1) through (5) above to command the shutter to open about two-thirds of the way, S=0.65. Using the calculated pulse duration times the shutter is commanded to open, then to close, and the output of photometer 128 is retrieved for six samples during the shutter waveform, as shown in FIG. 11.

The measured values $V_{1,1}$-$V_{1,6}$ from this first shutter opening are stored temporarily. Using $V_{max}$, the six measured values $V_{1,1}$-$V_{1,6}$ are converted to effective normalized strokes $S_{1,1}$-$S_{1,6}$ according to the following equation:

$$S_{n,m} = \sqrt{\frac{V_{n,m}}{V_{max}}} \quad (9)$$

It was assumed, to effect this conversion, that the amount of light measured by photometer 128 is proportional to the square of the stroke S. Using the normalized strokes $S_n$, a first correction of the shutter control constants $K_1$-$K_{11}$ is effected as follows:

$$K_1 = (T_{1,1} - K_2)/(S_{1,2} - S_{1,1}). \quad (10)$$

This corrects the slope of the positive open pulse. Next, $K_2$ is adjusted as follows to correct the negative braking pulse:

$$K_5 = K_5 - [(K_1 \times T_{1,2} \times (S_{1,3} - S_{1,2}))/225], \quad (11)$$

where 225 is a constant that was arrived at empirically.

As shown by the solid curve in FIG. 11, if the negative braking pulse is too short, the opening portion of the shutter profile will overshoot. When this occurs, $(S_{1,3} - S_{1,2})$ will be a positive value and will increase $K_5$, thereby lengthening the negative braking pulse $T_{1,2}$. If the negative braking pulse is too long, the shutter profile will exhibit a "droop" as shown by the dotted lines in FIG. 11. In this instance $(S_{1,3} - S_{1,2})$ will be negative, thereby decreasing $K_5$ and shortening the negative braking pulse.

The duty cycle of the holding pulses is corrected by adjusting $K_6$ as follows:

$$K_6 = K_6 \times (0.65/S_{1,4}). \quad (12)$$

Finally, the negative closing pulse is corrected by adjusting $K_9$ as follows:

$$K_9 = T_{1,4} - [(S_{1,4} - S_{1,5}) \times K_8]. \quad (13)$$

Figure 12:
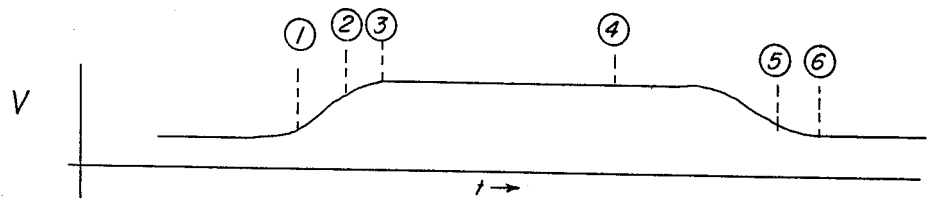

Using the corrected control constants noted above, a new set of pulse duration times $T_{2,1}$-$T_{2,5}$ are calculated from equations (1) through (5) above for opening the shutter about one-fourth of the way, S=0.25. The shutter is commanded to open and close, and six measurements of the shutter profile are retrieved as shown in FIG. 12. The measured voltages $V_{2,1}$-$V_{2,6}$ are converted to strokes $S_{2,1}$-$S_{2,6}$ using equation (9) above.

A final adjustment of the control constants $K_1$-$K_{11}$ is made to customize the control constants for the particular shutter being calibrated, as follows:

$$K_1 = (T_{1,1} - T_{2,1})/(S_{1,2} - S_{2,2}) \quad (14)$$

$$K_2 = T_{2,1} - (S_{2,2} \times K_1) \quad (15)$$

$$K_4 = (TA - K_3) \times S_{1,2}^2 - TB + K_3 \times S_{2,2}^2/S_{1,2} - S_{2,2} \quad (16)$$

where $TA = T_{1,2} - [(K_1 \times T_{1,2} \times (S_{1,3} - S_{1,2}))/225]$, and
$TB = T_{2,2} - [(K_1 \times T_{2,2} \times (S_{2,3} - S_{2,2}))/225]$.

$$K_5 = TB - (K_3 \times S_{2,2}^2) - (K_4 \times S_{2,2}) \quad (17)$$

$$K_6 = (T_{1,3} - T_{2,3})/(S_{1,4} - S_{2,4}) \quad (18)$$

$$K_7 = T_{2,3} - (K_6 \times S_{2,4}) \quad (19)$$

$$K_8 = (TC - TD)/(S_{1,4} - S_{2,4}) \quad (20)$$

where $TC = T_{1,4} + (K_8 \times S_{1,5})$, and $TD = T_{2,4} + (K_8 \times S_{1,5})$.

$$K_9 = TD - (K_8 \times S_{2,4}) + 5 \quad (21)$$

$$K_{10} = (TE - TF)/(S_{1,4} - S_{2,4}) \quad (22)$$

where $TE = T_{1,5} - [(K_8 \times T_{1,5} \times (S_{1,4} - S_{1,5}))/225]$,
and $TF = T_{2,5} - [(K_8 \times T_{2,5} \times (S_{2,4} - S_{2,5}))/255]$.

$$K_{11} = TF = (K_{10} \times S_{2,4}). \quad (23)$$

This completes the customization of the control constants for the shutter. The shutter drive calibration subroutine returns the custom constants $K_1$–$K_{11}$ to the main calibration program. Using the program shown in FIG. 10a–b, the maximum time for calibrating a shutter actuator was about 5.6 seconds.

A group of shutter actuators were operated with nominal control constants, and the response of the shutters to seven different exposure commands was recorded. The average exposure error for the shutter actuators operated with nominal control constants was about one stop with a standard deviation of about one stop. Then the sutter actuators were exercised using the customized control constants produced by the calibration technique according to the present invention for each individual shutter. The response of the shutter actuators was measured and the average exposure error was observed to have been reduced to about one-tenth stop with a standard deviation of about two-tenths of a stop. This measured error was the same magnitude as the accuracy of the A-D converter employed in the photometer 128.

Thus, according to the present invention, computer controlled cameras are manufactured with components having rather loose tolerance specifications, resulting in considerable variability from camera to camera, and as a final manufacturing operation, the cameras are exercised using a nominal control program, the responses of the camera components are measured, and customized control constants are computed for each camera. The customized control constants are then programed into a programable memory associated with the computer in the camera to produce a highly accurate, highly uniform camera.

The present invention has been described in detail with reference to exemplary embodiments, however it will be understood that variations and modifications can be made within the spirit and scope of the claims. For instance, other components of the camera such as the camera range finder 14 and the camera photometer 20, can also be calibrated as a final assembly step and custom calibration constants stored in the programable memory according to the present invention. Furthermore, variability in several system components which include both input and output transducers are removed in one operation by operating the camera under known photographic conditions and adjusting parameters to produce nominal results. For example, the photometer and the shutter actuator can be calibrated simultaneously by illuminating both the camera taking optics and the photometer photocell with a known quantity of light, and operating the shutter/aperture actuator under control of the photometer using nominal operating constants; measuring the response of the shutter; and adjusting the operating constants to produce nominal camera response.

Similarly, the autofocus system including the range finder and the lens position servo can be calibrated simultaneously by presenting a standard resolution target at known distances and measuring the focus of the image of the target in the image plane of the camera. An image sharpness meter suitable for use in such a calibration scheme is disclosed in the article "Image Sharpness Meter," Photographic Science and Engineering, Vol. 5, No. 6, November-December, 1961.

The use of the programable memory to store the operating constants greatly facilitates camera repair since when a part is replaced in the camera, the camera may easily be recalibrated and the new operating constants stored in the programable memory.

We claim:

1. A method of manufacturing a photographic camera of the type having a digital controller and at least one input transducer such as a position sensor, a rangefinder, or a light measurement circuit and at least one controlled electromechanical output transducer such as a shutter, aperture, or focus actuator, said method comprising the steps of:

first making the photographic camera with said digital controller including: (1) a microcomputer, with a memory, adapted to receive inputs from said input transducer and to control said output transducer in response thereto, according to a general control program stored in said memory and including (2) a programable memory for storing control constants to custom tailor said general control program to the particular camera in which it resides;

operating said photographic camera under known operating conditions using a nominal control program;

measuring the response of said output transducer under said known operating conditions and generating said control constants based on said measured responses to bring the operation of said camera into conformity with desired parameters; and programing the programable memory by means of external programing equipment, with said control constants.

2. A photographic camera comprising:

a digital controller including at least one input transducer such as a position sensor, rangefinder, or light sensor and at least one controlled electromechanical output transducer such as a shutter, aperture, or focus actuator, said digital controller including a microcomputer having a memory containing a general control program responsive to inputs from said input transducer to control said output transducer, and a programable memory containing custom control constants for custom tailoring said general control program to the particular camera.

3. In a photographic camera of the type having a digital controller including a microcomputer, one or more input transducers such as a position sensor, a rangefinder, or a light measuring circuit connected to the microcomputer, one or more electromechanical output transducers such as an aperture, a shutter or a focus actuator and a memory containing an operating program for controlling said output transducer(s) in response to inputs received from said input transducer(s), the improvement comprising: a programable memory connected to said microcomputer containing custom control constants to custom tailor said operating program to the particular input and output transducers employed in said camera to being said camera into conformity with desired parameters, said custom control constants having been determined by exercising said camera using nominal control constants, monitoring the response of said camera, and generating said custom control constants based on said response.

4. A method of manufacturing a photographic camera having a digital controller for controlling an electromagnetic actuator of the type including an armature mounted for movement in a magnetic field and means for urging the armature toward a rest position, the controller including means for applying a first polarity voltage pulse to the armature for moving the armature against the force of said urging means to a selected position away from the rest position, and means for applying an opposite polarity voltage pulse to the armature for braking the armature at the selected position, said method comprising the steps of:

first making the photographic camera, with the digital controller including a microcomputer, with a memory, adapted to control said electromagnetic actuator according to a general control program stored in said memory, and including a programable memory for containing custom control constants used by the general control program to custom tailor said general program to the particular camera in which it resides;

operating said photographic camera under known operating conditions using a nominal control program;

measuring the response of said electromagnetic actuator under said known operating conditions and said nominal control constants and generating said custom control constants based on said measured response to bring the operation of said camera into conformity with desired parameters; and programing the programble memory with said custom control constants.

5. The invention claimed in claim 4, wherein, the duration of said first polarity voltage pulse is substantially a linear function of the distance to be moved and is of the form:

$$T_1 = (K_1 \times S) + K_2$$

where $T_1$ is the duration of the first polarity voltage pulse;
S is the distance to be moved; and
$K_1$ and $K_2$ are control constants, and wherein the duration of said opposite polarity voltage pulse is substantially a quadratic function of the distance to be moved and is of the form:

$$T_2 = (-K_3 S^2) + (K_4 \times S) + K_5$$

where $T_2$ is the duration of the opposite polarity voltage pulse;
S is the distance to be moved; and
$K_3$, $K_4$, and $K_5$ are control constants, and wherein said control constants $K_1 - K_5$ are said custom control constants.

6. A method of manufacturing a photographic camera having a light measuring circuit and a digital controller for controlling an electromagnetic shutter/aperture actuator in response to measured light, the actuator including an armature mounted for movement in a magnetic field and means for urging the armature toward a rest position, the controller including means for applying a first polarity voltage pulse to the actuator for opening the shutter/aperture to a selected position away from the rest position, and means for applying an opposite polarity voltage pulse to the actuator for braking the shutter/aperture at the selected position, said method comprising the steps of:

first making the camera, with the digital controller including a microcomputer, with a memory, for controlling said electromagnetic shutter/aperture actuator according to a general control program stored in said memory, and including a programable memory for storing custom control constants to custom tailor said general control program to the particular camera in which it resides;

operating the camera under known illumination conditions, using a nominal control program;

measuring the light transmitted through said shutter under said known illumination conditions and generating from said measured response, said custom control constants for said camera to bring the operation of said camera into conformity with desired parameters; and programing the programable memory with said customized control constants.

7. The invention claimed in claim 6 wherein, the duration of said first polarity voltage pulse is substantially a linear function of the distance to be moved and is of the form:

$$T_1 = (K_1 \times S) + K_2$$

where $T_1$ is duration of the first polarity voltage pulse;
S is the distance to be moved; and
$K_1$ and $K_2$ are control constants, and wherein the duration of said opposite polarity voltage pulse is substantially a quadratic function of the distance to be moved and is of the form:

$$T_2 = (-K_3 \times S^2) + (K_4 \times S) + K_5$$

where $T_2$ is the duration of the opposite polarity voltage pulse;
S is the distance to be moved; and
$K_3$, $K_4$, and $K_5$ are control constants, and wherein said control constants $K_1 - K_5$ are said custom control constants.

8. A method of manufacturing a photographic camera having a light measuring circuit, and a digital controller, responsive to said light measuring circuit for controlling a shutter/aperture actuator, said method comprising the steps of:

first making the camera, with the digital controller including a microcomputer with a memory for controlling said shutter actuator according to a general control program stored in said memory, and including a programable memory for storing customized control constants to said general control program to custom tailor said general control program to the particular camera in which it resides;

operating the camera under controlled light conditions, using a nominal control program;

measuring the exposure produced by said shutter/aperture actuator under said controlled light conditions and generating from said measured exposure, custom control constants for said controller for bringing the operation of the camera into conformity with desired parameters; and programing said programable memory with said custom control constants.

9. A method of manufacturing a photographic camera having a rangefinder circuit and a digital controller for controlling a lens focus actuator in response to range information produced by the rangefinder circuit, said method comprising the steps of:

first making the camera, with the digital controller including a microcomputer with a memory for controlling said lens focus actuator according to a general control program stored in said memory, and including a programable memory for storing customized control constants used in said general control program to custom tailor said general control program to the particular camera in which it resides;

operating the camera under controlled range conditions, using a nominal control program;

measuring the focus actuation produced by said focus actuator under said controlled range conditions and generating from said measured actuation, custom control constants for said controller for bringing the operation of the camera into conformity with desired parameters; and programming said programable memory with said custom control constants.

* * * * *